(12) United States Patent
Tsai et al.

(10) Patent No.: US 11,521,811 B1
(45) Date of Patent: Dec. 6, 2022

(54) KEY DEVICE FOR A KEYBOARD

(71) Applicant: SUNREX TECHNOLOGY CORP., Taichung (TW)

(72) Inventors: Chia-Hung Tsai, Taichung (TW); Shih-Pin Lin, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 17/542,268

(22) Filed: Dec. 3, 2021

(30) Foreign Application Priority Data

May 25, 2021 (TW) .................................. 110205987

(51) Int. Cl.
  *H01H 13/705* (2006.01)
  *G06F 3/02* (2006.01)
(52) U.S. Cl.
  CPC ......... *H01H 13/705* (2013.01); *G06F 3/0202* (2013.01); *H01H 2211/022* (2013.01); *H01H 2233/03* (2013.01)
(58) Field of Classification Search
  CPC ........... H01H 13/705; H01H 2211/022; H01H 2233/03; H01H 3/12; H01H 3/122; H01H 3/125; H01H 13/7065; H01H 13/70; G06F 3/0202; G06F 3/02
  See application file for complete search history.

(56) References Cited

U.S. PATENT DOCUMENTS

| 10,586,662 | B2 * | 3/2020 | Wu | H01H 3/125 |
| 11,177,084 | B1 * | 11/2021 | Liu | H01H 3/125 |
| 11,177,091 | B1 * | 11/2021 | Tsai | H01H 13/7065 |
| 2018/0025859 | A1 * | 1/2018 | Chen | H01H 13/7065 200/5 A |

* cited by examiner

*Primary Examiner* — Lheiren Mae A Caroc
(74) *Attorney, Agent, or Firm* — DLA Piper LLP US

(57) ABSTRACT

A key device for a keyboard includes a circuit board, a keycap located over the circuit board, a supporting plate disposed under the circuit board, a first stabilizing member, a second stabilizing member and two supporting members. The supporting plate includes two first mounting seats cooperatively defining a rotating axis extending in a first direction. Each of the first stabilizing member and the second stabilizing member is made of a plastic material, slidably engages the keycap, and is rotatably mounted to the first mounting seats. When the keycap is pressed toward the supporting plate, the first stabilizing member and the second stabilizing member rotate relative to the supporting plate about the rotating axis.

8 Claims, 7 Drawing Sheets

KEY DEVICE FOR A KEYBOARD

CROSS-REFERENCE TO RELATED APPLICATION

This application claims priority to Taiwanese Utility Model Patent Application No. 110205987, filed on May 25, 2021.

FIELD

The disclosure relates to a key device for a keyboard, and more particularly to a key device serving as a large key, such as the Space, Enter or Shift keys, on a keyboard.

BACKGROUND

For a current keyboard, keycaps of some keys (e.g., a space key, an enter key and a backspace key) are generally larger than those of the rest of the keys so that a user may type faster and more accurately. The keys with larger keycaps on a keyboard are usually called large/long keys.

Generally, when a user exerts a force to press a large key, distribution of pressure on the large key is not uniform, which may cause the large key to tilt or wobble. Therefore, a conventional key device that is prevented from tilting or wobbling when pressed is used to serve as the large key. The conventional key device is disposed on a keyboard and includes a keycap and two stabilizers. The keyboard includes a base board that has two engaging units. Each of the stabilizers interconnects the base board and the keycap, and has two open ends respectively engaging the engaging units of the base board. By virtue of the stabilizers, the keycap may smoothly move toward the base board without tilting or wobbling when the conventional key device is pressed by a user.

However, the base board of the keyboard and the stabilizers are made of a metal material, and the stabilizers are slidable in a sliding zone defined by the engaging units of the base board. Consequently, when a computer that the keyboard is connected to plays sound through a built-in speaker, vibrations of the stabilizers and the base board caused by resonance may generate loud noise, and may make the stabilizers strike the base board.

SUMMARY

Therefore, an object of the disclosure is to provide a key device for a keyboard that can alleviate at least one of the drawbacks of the prior art.

According to the disclosure, the key device includes a circuit board, a keycap, a supporting plate, a first stabilizing member, a second stabilizing member and two supporting members. The keycap is located over the circuit board and has an inner surface facing the circuit board, an outer surface facing away from the circuit board, two first engaging members and two second engaging members. The first engaging members and the second engaging members are disposed on the inner surface of the keycap. The supporting plate is disposed under the circuit board and includes a board body and two first mounting seats. The first mounting seats are spaced apart from each other in a first direction, are disposed on a surface of the board body facing the circuit board, and cooperatively define a rotating axis extending in the first direction. The first stabilizing member is made of a plastic material and includes a first stabilizing rod and two first extending rods. The first stabilizing rod extends in the first direction and slidably engages the first engaging members. The first extending rods respectively extend from two opposite ends of the first stabilizing rod. Each of the first extending rods has a first mounting section rotatably mounted to a respective one of the first mounting seats such that the first stabilizing member is rotatable relative to the supporting plate about the rotating axis. The second stabilizing member is made of a plastic material and includes a second stabilizing rod and two second extending rods. The second stabilizing rod extends in the first direction and slidably engages the second engaging members. The second extending rods respectively extend from two opposite ends of the second stabilizing rod. Each of the second extending rods has a second mounting section rotatably mounted to a respective one of the first mounting seats such that the second stabilizing member is rotatable relative to the supporting plate about the rotating axis. Each of the supporting members interconnects the supporting plate and the keycap, and is located between the first mounting seats of the supporting plate. When the keycap is pressed toward the supporting plate, the first stabilizing rod and the second stabilizing rod slide relative to the first engaging members and the second engaging members in a second direction perpendicular to the first direction, and the first stabilizing member and the second stabilizing member simultaneously rotate about the rotating axis.

BRIEF DESCRIPTION OF THE DRAWINGS

Other features and advantages of the disclosure will become apparent in the following detailed description of the embodiment with reference to the accompanying drawings, of which.

DETAILED DESCRIPTION

It should be noted that, directional terms, such as "vertical," "horizontal," "upper," "lower," "inner," "inwardly," "outer," "outwardly," "front," "rear," "left," "right", "top" and "bottom," may be used to assist in describing the disclosure based on the orientation of the embodiment shown in the illustrations. The use of these directional definitions should not be interpreted to limit the disclosure in any way.

Figure 1:
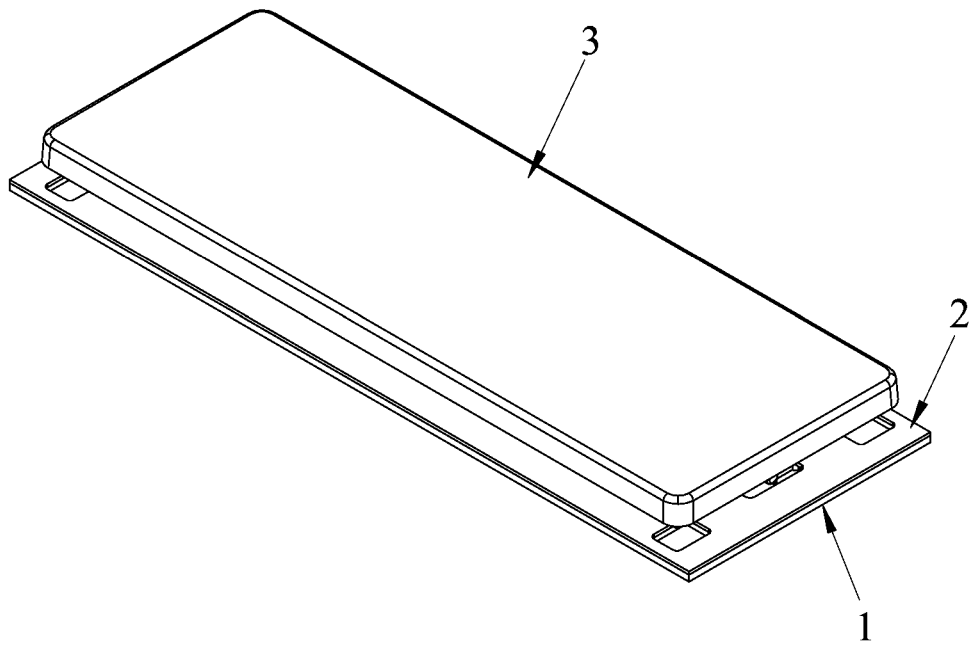
FIG. 1 is a perspective view of an embodiment of a key device according to the disclosure.
Figure 2:
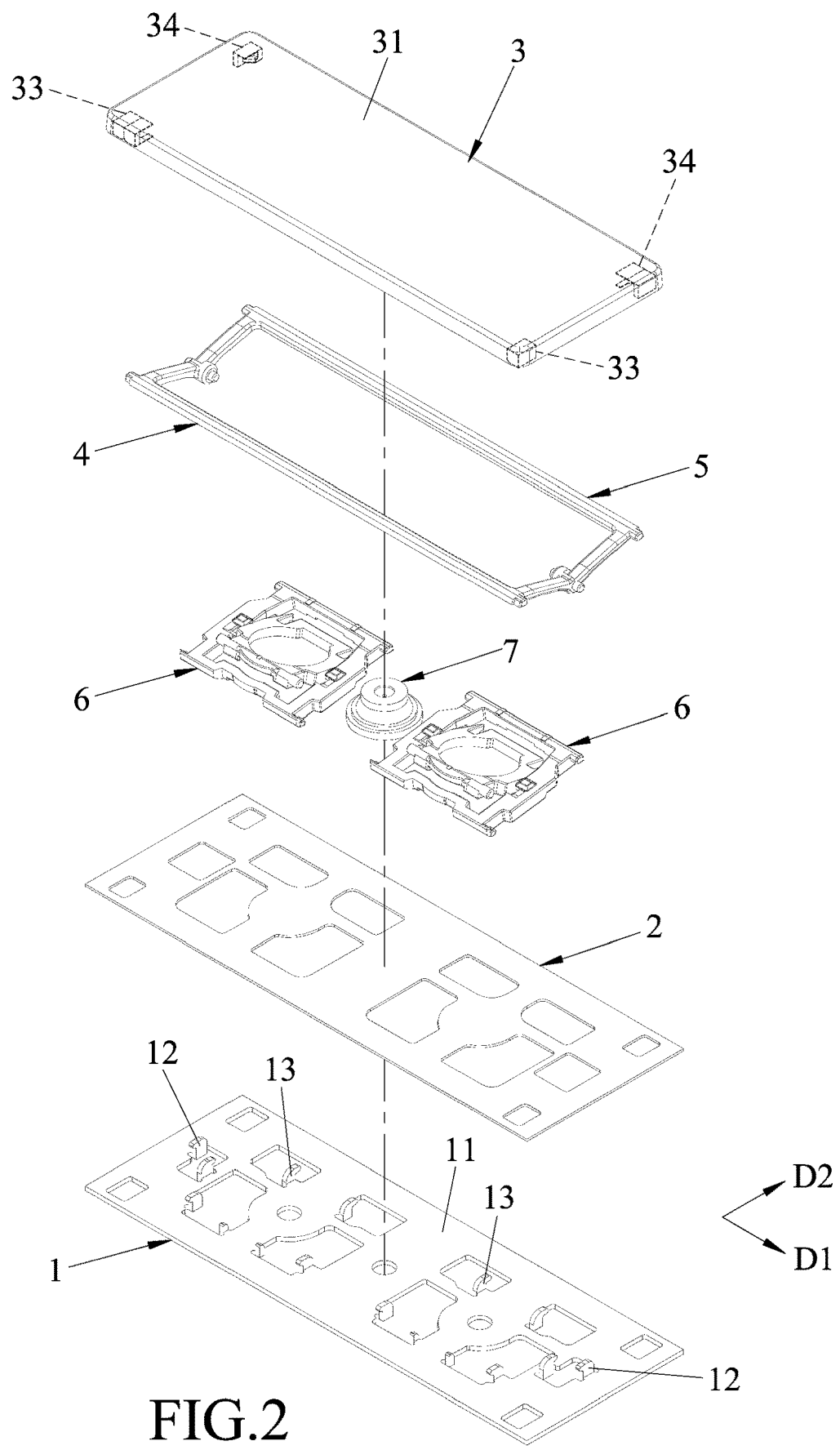
FIG. 2 is a partly exploded perspective view of the embodiment.
Figure 3:
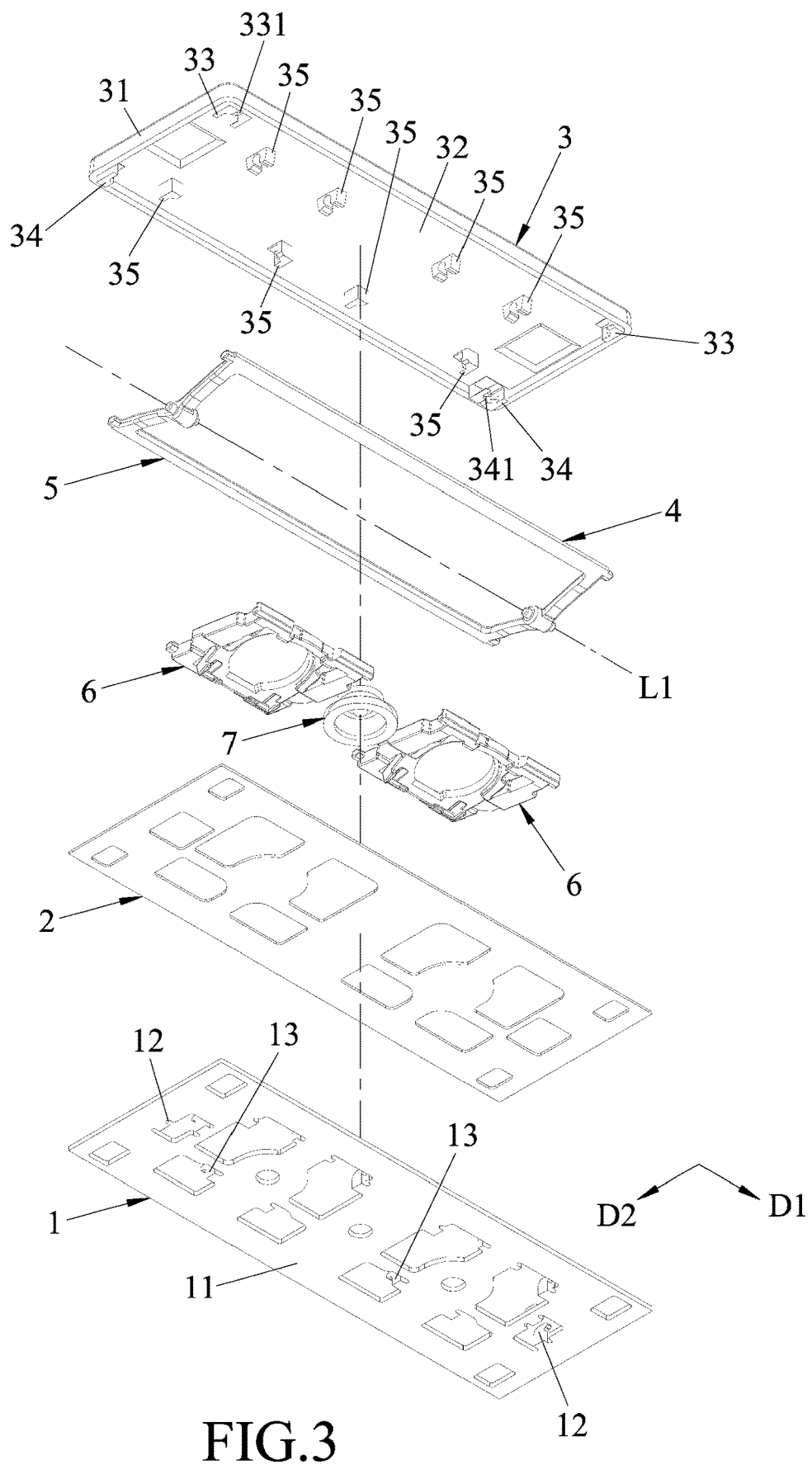
FIG. 3 is another partly exploded perspective view of the embodiment.

Referring to FIGS. 1 to 3, an embodiment of a key device according to the disclosure includes a supporting plate 1, a circuit board 2, a keycap 3, a first stabilizing member 4, a second stabilizing member 5, two supporting members 6 and an elastic member 7.

The supporting plate 1 is disposed under the circuit board 2 and includes a board body 11, two first mounting seats 12 and two second mounting seats 13. The first mounting seats 12 are spaced apart from each other in a first direction (D1), are disposed on a top surface of the board body 11 (i.e., a surface of the board body 11 that faces the circuit board 2), and cooperatively define a rotating axis (L1) that extends in the first direction (D1). The second mounting seats 13 are spaced apart from each other in the first direction (D1), are disposed on the top surface of the board body 11, and are located between the first mounting seats 12.

The circuit board 2 is configured to be a thin-film circuit board and generates a signal upon depression of the key device. There will be no further details describing the circuit board 2 and functions thereof since they are widely-understood by those skilled in the art of thin-film circuit boards and are not the main technical characteristics of the key device.

The keycap 3 is located over the circuit board 2 and has an inner surface 32, an outer surface 31, two first engaging members 33, two second engaging members 34 and eight connecting members 35. In this embodiment, the keycap 3 is made of a plastic material. The inner surface 32 faces the circuit board 2. The outer surface 31 faces away from the circuit board 2. The first engaging members 33, the second engaging members 34 and the connecting members 35 are disposed on the inner surface 32. It is noted that the number of the connecting members 35 is not limited to eight, and may vary according to operational requirements. Each of the first engaging members 33 may be configured to be, but not limited to, an L-shaped or a U-shaped protrusion protruding from the inner surface 32, and is indented with a first groove 331. Each of the second engaging members 34 may be configured to be, but not limited to, an L-shaped or a U-shaped protrusion protruding from the inner surface 32, and is indented with a second groove 341. In this embodiment, one of the first engaging members 33 and one of the second engaging members 34 are the L-shaped protrusions, and the other one of the first engaging members 33 and the other one of the second engaging members 34 are the U-shaped protrusions. Each of the connecting members 35 protrudes from the inner surface 32.

Figure 4:
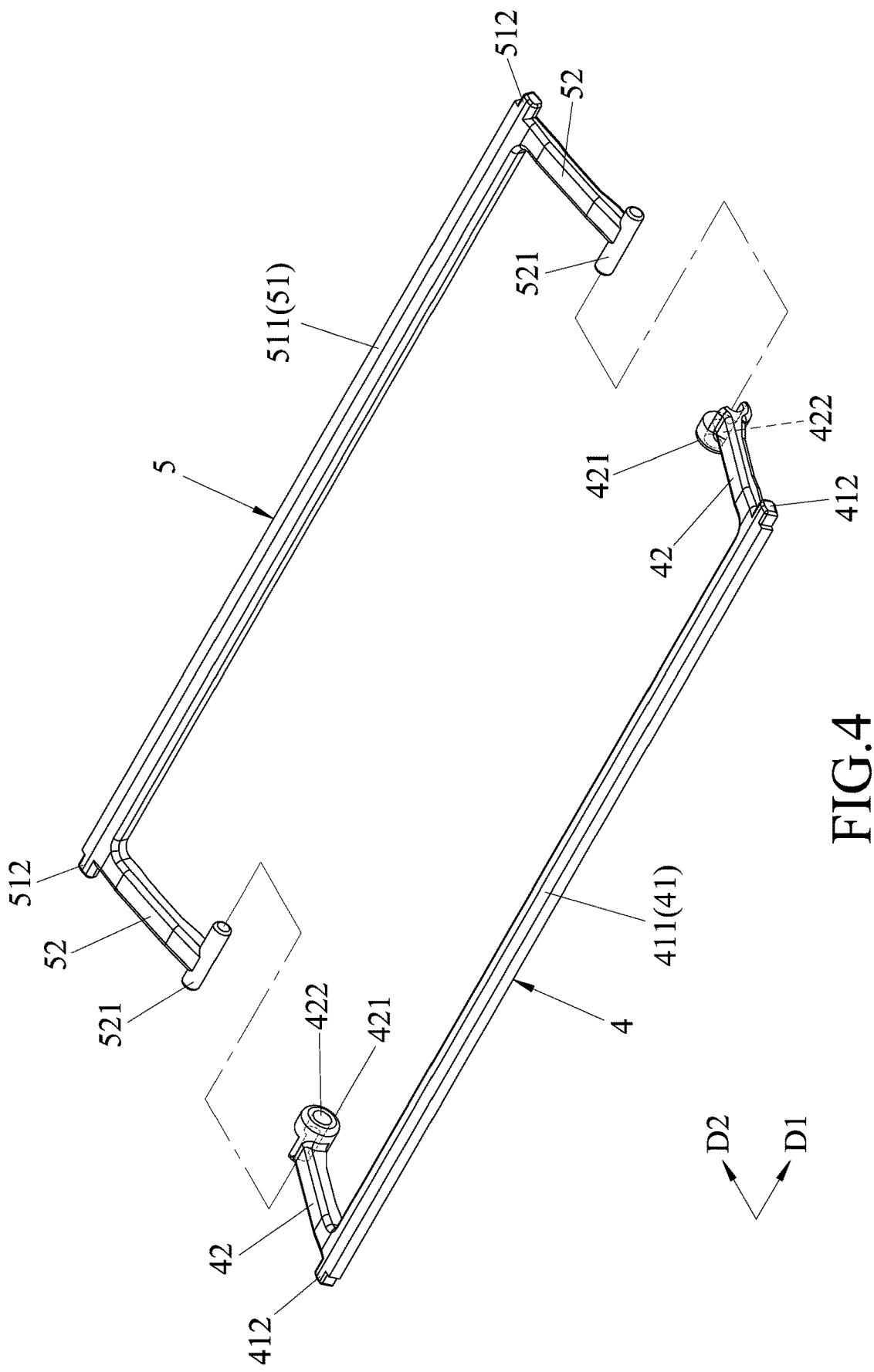
FIG. 4 is a perspective view of a first stabilizing member and a second stabilizing member of the embodiment.
Figure 5:
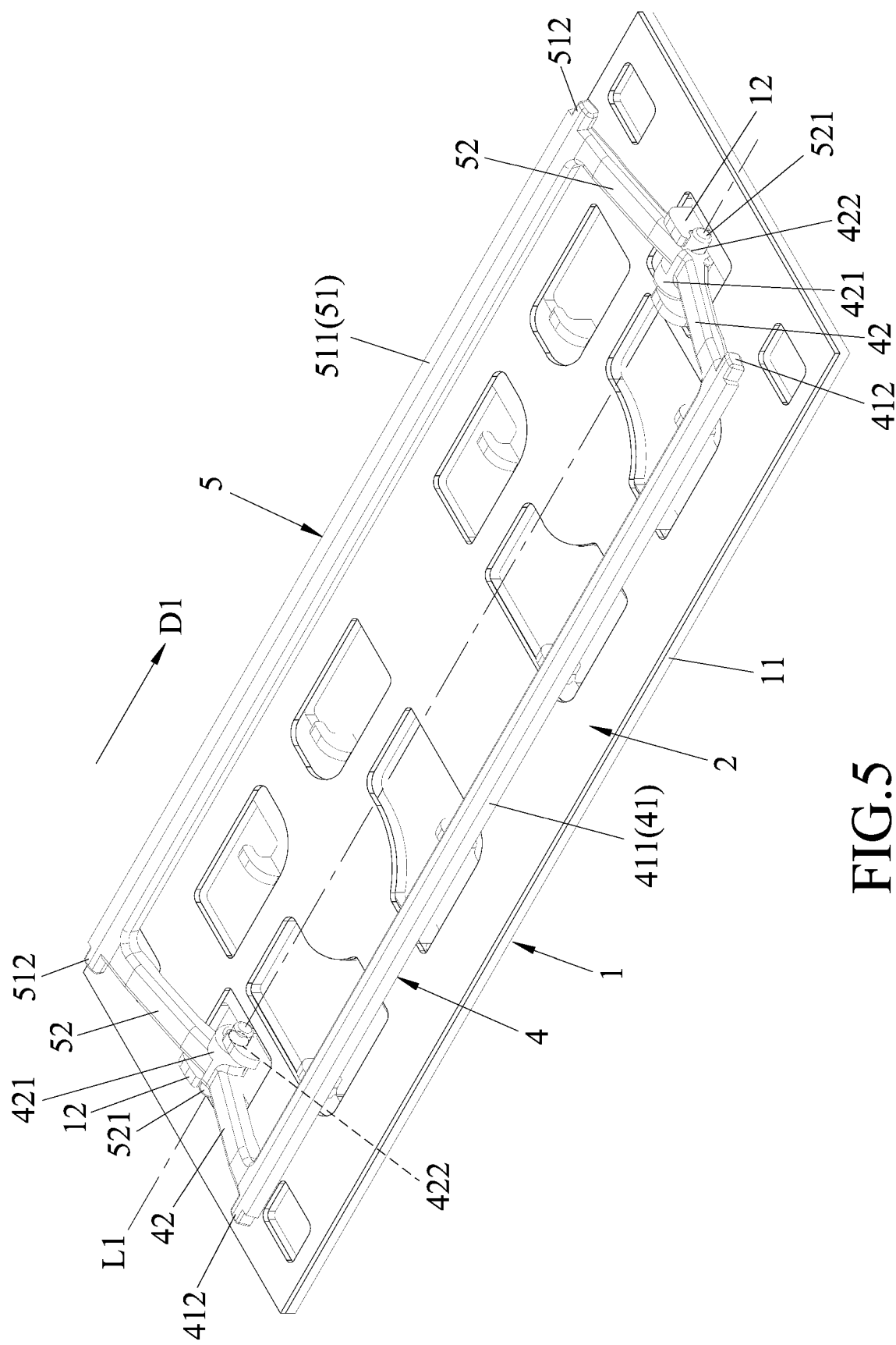
FIG. 5 is a perspective view illustrating a supporting plate of the embodiment mounted with the first stabilizing member and the second stabilizing member.

Referring further to FIGS. 4 and 5, the first stabilizing member 4 includes a first stabilizing rod 41 that extends in the first direction (D1) and two first extending rods 42 that respectively extend from two opposite ends of the first stabilizing rod 41. Specifically, the first extending rods 42 extend in the same direction. In this embodiment, the first stabilizing member 4 is made of a plastic material.

The first stabilizing rod 41 of the first stabilizing member 4 slidably engages the first engaging members 33 of the keycap 3. Specifically, the first stabilizing rod 41 has a first rod body 411 and two first rod protrusions 412. The first rod protrusions 412 respectively protrude from two opposite ends of the first rod body 411, and respectively and slidably engage the first grooves 331 of the first engaging members 33 (see FIG. 6).

Each of the first extending rods 42 of the first stabilizing member 4 has a first mounting section 421 that is rotatably mounted to a respective one of the first mounting seats 12 of the supporting plate 1 such that the first stabilizing member 4 is rotatable relative to the supporting plate 1 about the rotating axis (L1). In this embodiment, the first mounting section 421 of each of the first extending rods 42 is formed with a through hole 422 extending along the rotating axis (L1).

The second stabilizing member 5 includes a second stabilizing rod 51 that extends in the first direction (D1) and two second extending rods 52 that respectively extend from two opposite ends of the second stabilizing rod 51. Specifically, the second extending rods 52 extend in the same direction. In this embodiment, the second stabilizing member 5 is made of a plastic material.

The second stabilizing rod 51 of the second stabilizing member 5 slidably engages the second engaging members 34 of the keycap 3. Specifically, the second stabilizing rod 51 has a second rod body 511 and two second rod protrusions 512. The second rod protrusions 512 respectively protrude from two opposite ends of the second rod body 511, and respectively and slidably engage the second grooves 341 of the second engaging members 34 (see FIG. 6).

Each of the second extending rods 52 of the second stabilizing member 5 has a second mounting section 521 that is rotatably mounted to a respective one of the first mounting seats 12 of the supporting plate 1 such that the second stabilizing member 5 is rotatable relative to the supporting plate 1 about the rotating axis (L1). In this embodiment, the second mounting section 521 of each of the second extending rods 52 extends through the through hole 422 of a respective one of the first extending rods 42. Specifically, in this embodiment, the first mounting section 421 of each of the first extending rods 42 of the first stabilizing member 4 is configured as a sleeve, and the second mounting section 521 of each of the second extending rods 52 of the second stabilizing member 5 is configured as a shaft.

The supporting members 6 are spaced apart from each other in the first direction (D1), and are located between the first mounting seats 12 of the supporting plate 1. Each of the supporting members 6 interconnects the supporting plate 1 and the keycap 3. Specifically, each of the supporting members 6 engages a respective one of the second mounting seats 13 of the supporting plate 1 and a portion of the connecting members 35 of the keycap 3 to thereby interconnect the supporting plate 1 and the keycap 3. In this embodiment, each of the supporting members 6 is configured as a scissor linkage. Specifically, each of the supporting members 6 includes two cross-arms respectively and pivotably engaging the respective one of the second mounting seats 13 and the portion of the connecting members 35. There will be no further details describing the connection among the supporting members 6, the keycap 3 and the supporting plate 1 since the connection is widely-understood by those skilled in the art of keyboards and is not a main technical characteristic of the key device.

The elastic member 7 is disposed between the circuit board 2 and the keycap 3, and is located between the first mounting seats 12 of the supporting plate 1. In this embodiment, the elastic member 7 is configured as a rubber dome.

Figure 6:
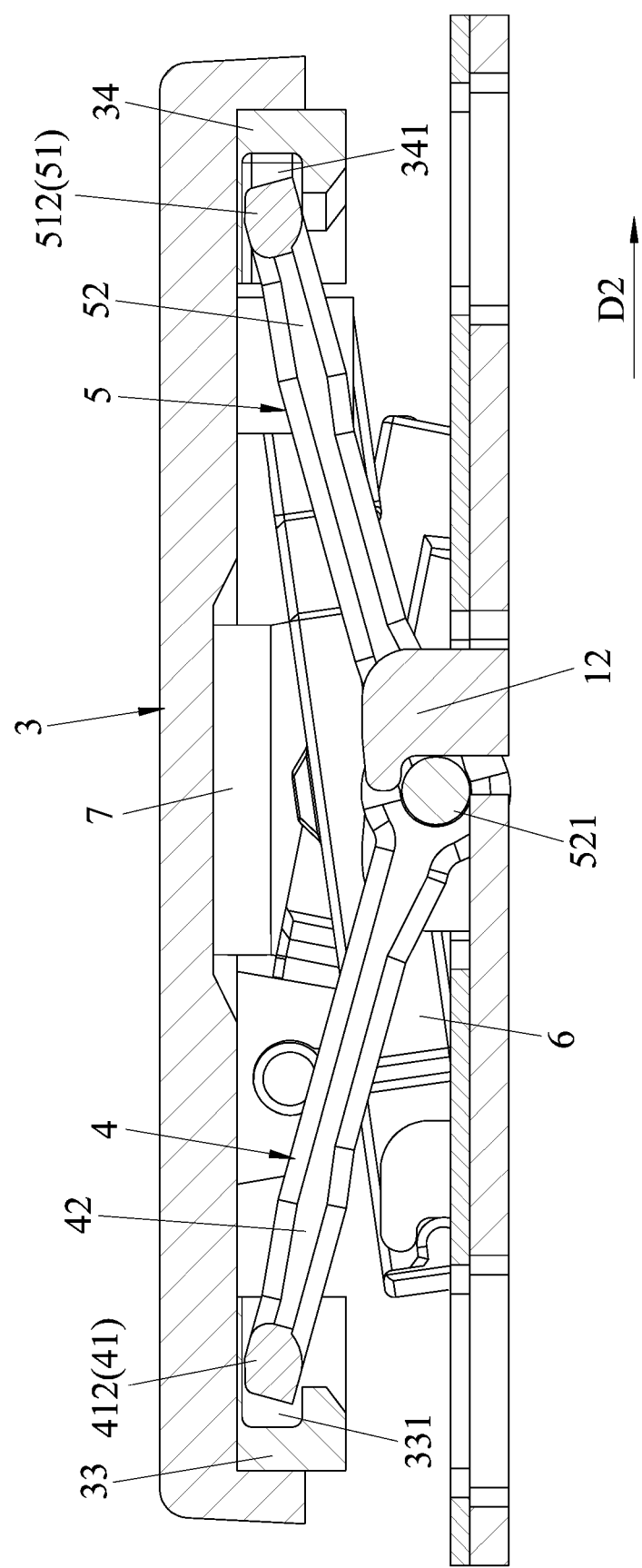
FIG. 6 is a sectional view illustrating the embodiment not affected by an external force.
Figure 7:
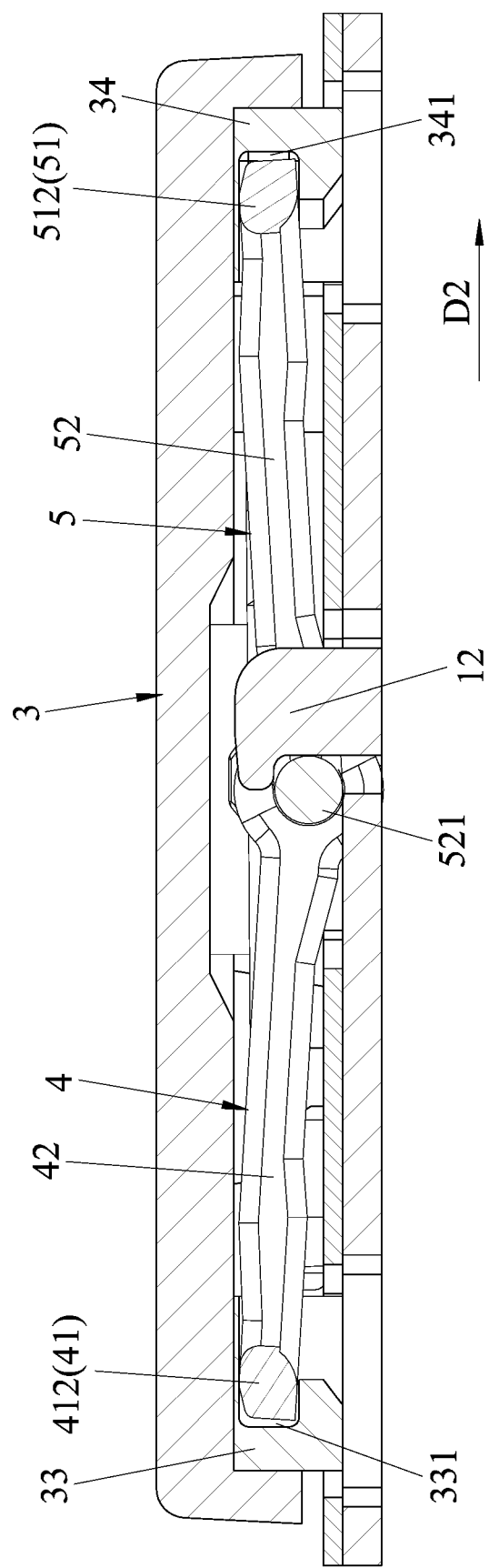
FIG. 7 is a sectional view illustrating the embodiment when it is pressed.

Referring further to FIGS. 6 and 7, the embodiment is convertible between an initial state (FIG. 6), in which the keycap 3 is not affected by an external force, and a pressed state (FIG. 7), in which the keycap 3 is pressed. When the embodiment is in the initial state, the elastic member 7 abuts against the keycap 3 to keep the keycap 3 at an initial position, at which the keycap 3 is distal from the supporting plate 1, and to keep the supporting member 6 in an outstretched state.

When the keycap 3 is pressed toward the supporting plate 1 by an external force, the first stabilizing rod 41 of the first stabilizing member 4 and the second stabilizing rod 51 of the second stabilizing member 5 slide relative to the first engaging members 33 and the second engaging members 34 of the keycap 3 in a second direction (D2) perpendicular to the first direction (D1), and the first stabilizing member 4 and the second stabilizing member 5 simultaneously rotate about the rotating axis (L1) (i.e., the first mounting sections 421 of the first stabilizing member 4 and the second mounting sections 521 of the second stabilizing member 5 simultaneously rotate about the rotating axis (L1)). Specifically, the first stabilizing rod 41 slides in the first grooves 331, and the second stabilizing rod 51 slides in the second grooves 341. Then, the keycap 3 is moved to a pressed position, at which the keycap 3 is proximate to the supporting plate 1, and the supporting member 6 is in a compressed state. Consequently, the embodiment is in the pressed state.

When the external force ceases to exist, the elastic member 7 provides a restoring force urging the keycap 3 to restore to the initial position, and urging the supporting member 6 to restore to the outstretched state. Consequently, the embodiment is restored to the initial state.

Because each of the keycap 3, the first stabilizing member 4 and the second stabilizing member 5 is made of a plastic material, the volume of noise that is generated when the first stabilizing rod 41 of the first stabilizing member 4 and the second stabilizing rod 51 of the second stabilizing member 5 slide relative to the first engaging members 33 and the second engaging members 34 of the keycap 3 is substantially reduced. Furthermore, because the first mounting sections 421 of the first stabilizing member 4 and the second mounting sections 521 of the second stabilizing member 5 are rotatably mounted to the first mounting seats 12 of the supporting plate 1, when the embodiment converts between the initial state and the pressed state, the first mounting sections 421 and the second mounting sections 521 rotate about the rotating axis (L1) instead of striking the first mounting seats 12. Consequently, excess noise may not be generated among the first mounting sections 421, the second mounting sections 521 and the first mounting seats 12.

In summary, by virtue of each of the keycap 3, the first stabilizing member 4 and the second stabilizing member 5 being made of a plastic material, by virtue of the first stabilizing member 4 slidably engaging the first engaging members 33 of the keycap 3 and being rotatably mounted to the first mounting seats 12 of the supporting plate 1, and by virtue of the second stabilizing member 5 slidably engaging the second engaging members 34 of the keycap 3 and being rotatably mounted to the first mounting seats 12 of the supporting plate 1, when the embodiment converts between the initial state and the pressed state, excess noise will not be generated. Moreover, when a computer that the embodiment is connected to plays sound through a built-in speaker, vibrations of the keycap 3, the first stabilizing member 4 and the second stabilizing member 5 caused by resonance may not generate loud noise, and may not make the first stabilizing member 4 and the second stabilizing member 5 strike the supporting plate 1. Therefore, the purpose of the disclosure is certainly fulfilled.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A key device for a keyboard, said key device comprising:
    a circuit board;
    a keycap located over said circuit board and having
        an inner surface that faces said circuit board,
        an outer surface that faces away from said circuit board,
        two first engaging members that are disposed on said inner surface, and
        two second engaging members that are disposed on said inner surface;
    a supporting plate disposed under said circuit board and including
        a board body and two first mounting seats that are spaced apart from each other in a first direction, that are disposed on a surface of said board body facing said circuit board, and that cooperatively define a rotating axis extending in the first direction;
    a first stabilizing member made of a plastic material and including
        a first stabilizing rod that extends in the first direction and that slidably engages said first engaging members, and
        two first extending rods that respectively extend from two opposite ends of said first stabilizing rod, each of said first extending rods having a first mounting section that is rotatably mounted to a respective one of said first mounting seats such that said first stabilizing member is rotatable relative to said supporting plate about the rotating axis;
    a second stabilizing member made of a plastic material and including
        a second stabilizing rod that extends in the first direction and that slidably engages said second engaging members, and
        two second extending rods that respectively extend from two opposite ends of said second stabilizing rod, each of said second extending rods having a second mounting section that is rotatably mounted to a respective one of said first mounting seats such that said second stabilizing member is rotatable relative to said supporting plate about the rotating axis; and
    two supporting members each of which interconnecting said supporting plate and said keycap, and located between said first mounting seats of said supporting plate;
    wherein, when said keycap is pressed toward said supporting plate, said first stabilizing rod and said second stabilizing rod slide relative to said first engaging members and said second engaging members in a second direction perpendicular to the first direction, and said first stabilizing member and said second stabilizing member simultaneously rotate about the rotating axis.

2. The key device as claimed in claim 1, further comprising an elastic member that is disposed between said circuit board and said keycap, and that is located between said first mounting seats of said supporting plate.

3. The key device as claimed in claim 1, wherein:
said first mounting section of each of said first extending rods of said first stabilizing member is formed with a through hole extending along the rotating axis; and
said second mounting section of each of said second extending rods of said second stabilizing member extends through said through hole of a respective one of said first extending rods.

4. The key device as claimed in claim 1, wherein:
said first stabilizing rod of said first stabilizing member has a first rod body, and two first rod protrusions respectively protruding from two opposite ends of said first rod body and respectively and slidably engage said first engaging members of said keycap; and
said second stabilizing rod of said second stabilizing member has a second rod body, and two second rod protrusions respectively protruding from two opposite ends of said second rod body and respectively and slidably engage said second engaging members of said keycap.

5. The key device as claimed in claim 1, wherein said keycap further includes a plurality of connecting members disposed on said inner surface thereof, each of said supporting members engaging a portion of said connecting members.

6. The key device as claimed in claim 5, wherein said supporting plate further includes two second mounting seats spaced apart from each other in the first direction and disposed on the surface of said board body facing said circuit board, each of said supporting members engaging a respective one of said second mounting seats and said portion of said connecting members to thereby interconnect said supporting plate and said keycap.

7. The key device as claimed in claim 1, wherein:
said first mounting section of each of said first extending rods of said first stabilizing member is configured as a sleeve; and
said second mounting section of each of said second extending rods of said second stabilizing member is configured as a shaft.

8. The key device as claimed in claim 1, wherein each of said supporting members is configured as a scissor linkage.

* * * * *